(12) United States Patent
Kwan (10) Patent No.: US 7,979,903 B2
(45) Date of Patent: Jul. 12, 2011

(54) SYSTEM AND METHOD FOR SOURCE IP ANTI-SPOOFING SECURITY

(75) Inventor: Philip Kwan, San Jose, CA (US)

(73) Assignee: Foundry Networks, LLC, San Jose, CA (US)

(*) Notice: Subject to any disclaimer, the term of this patent is extended or adjusted under 35 U.S.C. 154(b) by 124 days.

(21) Appl. No.: 12/392,398

(22) Filed: Feb. 25, 2009

(65) Prior Publication Data

US 2009/0254973 A1    Oct. 8, 2009

Related U.S. Application Data

(63) Continuation of application No. 10/631,366, filed on Jul. 31, 2003, now Pat. No. 7,523,485.

(60) Provisional application No. 60/472,158, filed on May 21, 2003, provisional application No. 60/472,170, filed on May 21, 2003.

(51) Int. Cl.
*G06F 12/14* (2006.01)
(52) U.S. Cl. ............................................. 726/23; 726/22
(58) Field of Classification Search .................. None
See application file for complete search history.

(56) References Cited

U.S. PATENT DOCUMENTS

| | | | |
|---|---|---|---|
| 4,897,874 A | 1/1990 | Lidinsky et al. | |
| 5,237,614 A | 8/1993 | Weiss | |
| 5,721,780 A | 2/1998 | Ensor et al. | |
| 5,757,924 A | 5/1998 | Friedman et al. | |
| 5,774,551 A | 6/1998 | Wu et al. | |
| 5,825,890 A | 10/1998 | Elgamal et al. | |
| 5,835,720 A * | 11/1998 | Nelson et al. | 709/224 |
| 5,892,903 A | 4/1999 | Klaus | |
| 5,894,479 A | 4/1999 | Mohammed | |
| 5,946,308 A | 8/1999 | Dobbins et al. | |
| 5,958,053 A | 9/1999 | Denker | |
| 6,009,103 A | 12/1999 | Woundy | |
| 6,021,495 A | 2/2000 | Jain et al. | |
| 6,167,052 A | 12/2000 | McNeill et al. | |
| 6,167,445 A | 12/2000 | Gai et al. | |
| 6,212,191 B1 | 4/2001 | Alexander et al. | |
| 6,219,790 B1 | 4/2001 | Lloyd et al. | |
| 6,256,314 B1 | 7/2001 | Rodrig et al. | |
| 6,338,089 B1 | 1/2002 | Quinlan | |
| 6,339,830 B1 | 1/2002 | See et al. | |
| 6,363,489 B1 | 3/2002 | Comay et al. | |

(Continued)

OTHER PUBLICATIONS

Gill (Stephen Gill, "Catalyst Secure Template", Vs. 1.21, Nov. 14, 2002, found on http://www.cymru.com/gillsr/documents/catalyst-secure-template.htm), p. 1-19.*

(Continued)

*Primary Examiner* — Peter Poltorak
(74) *Attorney, Agent, or Firm* — Kilpatrick Townsend & Stockton LLP (57) ABSTRACT

A system and method that provides for using source IP addresses and MAC addresses in a network to provide security against attempts by users of the network to use false source IP addresses in data packets. The system and method provide for analyzing MAC addresses and source IP addresses at the datalink (layer 2) level, and to use the information derived from such analysis to block access through a port where a host device is using a false, or spoofed, source IP address in transmitted data packets.

20 Claims, 4 Drawing Sheets

U.S. PATENT DOCUMENTS

| | | | |
|---|---|---|---|
| 6,393,484 | B1 | 5/2002 | Massarani |
| 6,496,502 | B1 | 12/2002 | Fite, Jr. et al. |
| 6,510,236 | B1 | 1/2003 | Crane et al. |
| 6,519,646 | B1 | 2/2003 | Gupta et al. |
| 6,553,028 | B1 | 4/2003 | Tang et al. |
| 6,615,264 | B1 | 9/2003 | Stoltz et al. |
| 6,651,168 | B1 | 11/2003 | Kao et al. |
| 6,665,278 | B2 | 12/2003 | Grayson |
| 6,728,246 | B1 | 4/2004 | Egbert et al. |
| 6,732,270 | B1 | 5/2004 | Patzer et al. |
| 6,751,728 | B1 | 6/2004 | Gunter et al. |
| 6,771,649 | B1 | 8/2004 | Tripunitara et al. |
| 6,775,290 | B1 | 8/2004 | Merchant et al. |
| 6,789,118 | B1 | 9/2004 | Rao |
| 6,807,179 | B1 | 10/2004 | Kanuri et al. |
| 6,813,347 | B2 | 11/2004 | Baals et al. |
| 6,853,988 | B1 | 2/2005 | Dickinson et al. |
| 6,874,090 | B2 | 3/2005 | See et al. |
| 6,892,309 | B2 | 5/2005 | Richmond et al. |
| 6,907,470 | B2 | 6/2005 | Sawada et al. |
| 6,912,592 | B2 | 6/2005 | Yip |
| 6,950,628 | B1 | 9/2005 | Meier et al. |
| 6,959,336 | B2 | 10/2005 | Moreh et al. |
| 6,980,515 | B1 | 12/2005 | Schunk et al. |
| 6,981,054 | B1 | 12/2005 | Krishna |
| 7,028,098 | B2 | 4/2006 | Mate et al. |
| 7,062,566 | B2 | 6/2006 | Amara et al. |
| 7,079,537 | B1 | 7/2006 | Kanuri et al. |
| 7,088,689 | B2 | 8/2006 | Lee et al. |
| 7,092,943 | B2 | 8/2006 | Roese et al. |
| 7,093,280 | B2 | 8/2006 | Ke et al. |
| 7,113,479 | B2 | 9/2006 | Wong |
| 7,114,008 | B2 | 9/2006 | Jungck et al. |
| 7,134,012 | B2 * | 11/2006 | Doyle et al. ............... 713/151 |
| 7,155,518 | B2 | 12/2006 | Forslow |
| 7,188,364 | B2 | 3/2007 | Volpano |
| 7,194,554 | B1 | 3/2007 | Short et al. |
| 7,234,163 | B1 | 6/2007 | Rayes et al. |
| 7,249,374 | B1 | 7/2007 | Lear et al. |
| 7,302,700 | B2 | 11/2007 | Mao et al. |
| 7,360,086 | B1 | 4/2008 | Tsuchiya et al. |
| 7,360,245 | B1 * | 4/2008 | Ramachandran et al. ...... 726/13 |
| 7,469,298 | B2 | 12/2008 | Kitada et al. |
| 7,483,971 | B2 | 1/2009 | Sylvest et al. |
| 7,493,084 | B2 | 2/2009 | Meier et al. |
| 7,500,069 | B2 | 3/2009 | Hochmuth et al. |
| 7,516,487 | B1 | 4/2009 | Szeto et al. |
| 7,523,485 | B1 | 4/2009 | Kwan |
| 7,529,933 | B2 | 5/2009 | Palekar et al. |
| 7,536,464 | B1 | 5/2009 | Dommety et al. |
| 7,562,390 | B1 | 7/2009 | Kwan |
| 7,567,510 | B2 | 7/2009 | Gai et al. |
| 7,596,693 | B1 | 9/2009 | Caves et al. |
| 2001/0012296 | A1 | 8/2001 | Burgess et al. |
| 2002/0016858 | A1 | 2/2002 | Sawada et al. |
| 2002/0055980 | A1 | 5/2002 | Goddard |
| 2002/0065938 | A1 | 5/2002 | Jungck et al. |
| 2002/0146002 | A1 | 10/2002 | Sato |
| 2002/0146107 | A1 | 10/2002 | Baals et al. |
| 2003/0028808 | A1 | 2/2003 | Kameda |
| 2003/0043763 | A1 | 3/2003 | Grayson |
| 2003/0051041 | A1 | 3/2003 | Kalavade et al. |
| 2003/0056001 | A1 | 3/2003 | Mate et al. |
| 2003/0067874 | A1 | 4/2003 | See et al. |
| 2003/0105881 | A1 | 6/2003 | Symons et al. |
| 2003/0142680 | A1 | 7/2003 | Oguchi |
| 2003/0188003 | A1 | 10/2003 | Sylvest et al. |
| 2003/0226017 | A1 | 12/2003 | Palekar et al. |
| 2003/0236898 | A1 | 12/2003 | Hu et al. |
| 2004/0003285 | A1 * | 1/2004 | Whelan et al. ............... 713/201 |
| 2004/0053601 | A1 | 3/2004 | Frank et al. |
| 2004/0078485 | A1 * | 4/2004 | Narayanan ................... 709/242 |
| 2004/0160903 | A1 | 8/2004 | Gai et al. |
| 2004/0210663 | A1 | 10/2004 | Phillips et al. |
| 2004/0213172 | A1 | 10/2004 | Myers et al. |
| 2004/0213260 | A1 * | 10/2004 | Leung et al. ............... 370/395.3 |
| 2004/0255154 | A1 | 12/2004 | Kwan et al. |
| 2005/0025125 | A1 | 2/2005 | Kwan |
| 2005/0055570 | A1 | 3/2005 | Kwan et al. |
| 2005/0091313 | A1 | 4/2005 | Zhou et al. |
| 2005/0254474 | A1 | 11/2005 | Iyer et al. |
| 2006/0028996 | A1 | 2/2006 | Huegen et al. |
| 2006/0155853 | A1 | 7/2006 | Nesz et al. |
| 2007/0220596 | A1 | 9/2007 | Keeler et al. |
| 2009/0260083 | A1 | 10/2009 | Szeto et al. |
| 2009/0265785 | A1 | 10/2009 | Kwan |
| 2009/0307773 | A1 | 12/2009 | Kwan |

OTHER PUBLICATIONS

U.S. Appl. No. 12/392,422, filed Feb. 25, 2009, Szeto et al.
U.S. Appl. No. 10/631,091, filed Jul. 31, 2003, Philip Kwan.
U.S. Appl. No. 10/668,455, filed Sep. 23, 2003, Szeto et al.
U.S. Appl. No. 10/925,155, filed Aug. 24, 2004, Philip Kwan.
"Authenticated VLANs: Secure Network Access at Layer 2," An Alcatel White Paper, Nov. 2002, pp. 1-14, Alcatel Internetworking, Inc.
"Automatic Spoof Detector (aka Spoofwatch)," Jan. 28, 2002, at URL: http://www.anml.iu.edu/PDF/Automatic_Spoof_Detector.pdf, printed on Jul. 23, 2003, 2 pages.
"CERT® Incident Note IN-2000-04 (Denial of Service Attacks using Nameservers)," Jan. 2001, at URL: http://www.cert.org/incident_notes/IN-2000-04.html, printed on Jul. 23, 2003, 3 pages.
"Configuring Port-Based Traffic Control," Catalyst 3550 Multilayer Switch Software Configuration Guide, Cisco IOS Release 12.1 (13) EA1, Mar. 2003, pp. 1-14, Ch. 20, Cisco Systems, Inc.
"Configuring Network Security with ACLs," Catalyst 3550 Multilayer Switch Software Configuration Guide, Cisco IOS Release 12.1 (13) EA1, Mar. 2003, pp. 1-48, Ch. 27, Cisco Systems, Inc.
"Configuring 802.1X Port-Based Authentication," Catalyst 3550 Multilayer Switch Software Configuration Guide, Cisco IOS Release 12.1 (13) EA1, Mar. 2003, pp. 1-18, Ch. 9, Cisco Systems, Inc.
"Cisco—Cable Source _Verify and IP Address Security," at URL: http://www.cisco.com/en/US/tech/tk86/tk803/technologies_tech_note09186a00800a7828.shtml (PDF & web pages), printed on Jul. 23, 2003, 25 pages.
"CISCO Catalyst 1900 Series Switches," at URL: http://www.cisco.com/en/US/products/hw/switches/ps574/products_configuration_guide_chapter09186a008007ef90.html#xtocid3, printed on Jul. 29, 2003, 13 pages (PDF & web pages).
"CISCO IOS Software Releases 12.2 T," at URL: http://www.cisco.com/en/US/products/sw/iosswrel/ps1839/products_feature_guide09186a00801543c8.html#1027177, printed on Jul. 29, 2003, 26 pages (PDF & web pages).
Congdon, P. et al., "IEEE 802.1X Remote Authentication Dial in User Service (RADIUS) Usage Guidelines," The Internet Society, 2003, at URL: http://www.faqs.org/ftp/rfc/pdf/rfc3580.txt.pdf, 30 pages.
Glenn, M., "A Summary of DoS/DDoS Prevention, Monitoring and Mitigation Techniques in a Service Provider Enviroment." SANS Institute, Aug. 21, 2003, 34 pages.
Haviland, G. "Designing High Preformance Campus Intranets with Multilayer Switching." 1998, 33 pages, Cisco Systems, Inc.
"IP Addressing Services," at URL: http://www.cisco.com/en/US/tech/tk648/tk361/technologies_tech_note09186a0080094adb.shtml, printed on Jul. 29, 2003, 10 pages (PDF & web pages).
"[IP-spoofing Demystified] (Trust-Relationship Exploitation)," Jun. 1996, at URL: http://www.networkcommand.com/docs/ipspoof.txt, printed on May 18, 2003, 9 pages.
Sharma, K., "IP Spoofing," 2001, at URL: http://www.linuxgazette.com/issue63/sharma.html, printed on Jul. 23, 2003, 3 pages.
"Keen Veracity Legions of the Underground," at URL: http://www.legions.org/kv/kv7.txt, printed on Jun. 24, 2003, pp. 1-41, Issue 7.
"IEEE Standard for Local and Metropolitan Area Networks—Port-Based Network Access Control" IEEE Std 802.1X-2001, Jul. 13, 2001, pp. 1-134, IEEE, The Institute of Electrical and Electronics Engineers, Inc.
Microsoft, "Recommendations for IEEE 802.11 Access Points," at URL: http://www.microsoft.com/whdc/device/network/802x/AccessPts.mspx, printed on Mar. 8, 2007, Apr. 2, 2002, pp. 1-16.
Pfleeger, "Security in Computing," $2^{nd}$ edition, 1996, p. 426-434, Prentice Hall PTR, NJ.

Schmid, S. et al., "An Access Control Architecture for Microcellular Wireless IPv6 Networks," pp. 454-463, LCN 2001: proceedings : 26th Annual IEEE Conference on Local Computer Networks : Nov. 14-16, 2001 : Tampa, Florida, USA, IEEE Computer Society, Los Alamitos, US.

Bass, S., "Spoofed IP Address Distributed Denial of Service Attacks: Defense-in-Depth," at URL: http://www.sans.org/rr/threats/spoofed.php, printed on Jul. 23, 2003, Aug. 13, 2001, 7 pages, version 2.0.

"TECH BRIEF Extreme Ware 6.2," at URL: http://www.extremenetworks.com/libraries/prodpdfs/products/ex_ware_tech_brief.pdf, printed on Jul. 29, 2003, 8 pages (Extreme Networks PDF).

"Unified Access Architecture for Wired and Wireless Networks," at URL: http://www.extremenetworks.com/libraries/prodpdfs/products/UnifiedWireless.asp, printed on Jul. 29, 2003, 10 pages.

Final Office Action for U.S. Appl. No. 10/458,628, Mailed Feb. 26, 2009, 26 pages.

Non Final Office Action for U.S. Appl. No. 10/631,091, Mailed Jan. 12, 2007, 9 pages.

Final Office Action for U.S. Appl. No. 10/631,091, Mailed May 28, 2008, 13 pages.

Non Final Office Action for U.S. Appl. No. 10/631,091, Mailed Oct. 28, 2008, 15 pages.

Notice of Allowance for U.S. Appl. No. 10/631,091 Mailed Apr. 24, 2009, 9 pages.

Non Final Office Action for U.S. Appl. No. 10/631,366, Mailed Feb. 2, 2007, 14 pages.

Final Office Action for U.S. Appl. No. 10/631,366, Mailed Oct. 10, 2007, 17 pages.

Non Final Office Action for U.S. Appl. No. 10/631,366, Mailed Jul. 17, 2008, 12 pages.

Notice of Allowance for U.S. Appl. No. 10/631,366, Mailed Jan. 13, 2009, 10 pages.

Non Final Office Action for U.S. Appl. No. 10/668,455, Mailed Mar. 20, 2009, 25 pages.

Non Final Office Action for U.S. Appl. No. 10/850,505 Mailed Dec. 7, 2007, 14 pages.

Final Office Action for U.S. Appl. No. 10/850,505 Mailed Jun. 12, 2008, 12 pages.

Notice of Allowance for U.S. Appl. No. 10/850,505, Mailed Sep. 4, 2008, 6 pages.

Notice of Allowance for U.S. Appl. No. 10/850,505, Mailed Jan. 14, 2009, 10 pages.

Welcher, "Switching MultiLayer Switching," Chesapeake Netcraftsmen, Copyright 1999, pp. 1-7, available at URL: http//www.netcraftsmen.net/welcher/papers/switchhmls.html.

Wright, "Using Policies for Effective Network Management," International Journal of Network Management, Copyright 1999, pp. 118-125, John Wiley & Sons, Ltd.

Non-Final Office Action for U.S. Appl. No. 10/458,628, mailed on Oct. 8, 2009, 23 pages.

Final Office Action for U.S. Appl. No. 10/458,628, mailed on Mar. 24, 2010, 29 pages.

Final Office Action for U.S. Appl. No. 10/631,898, mailed on Dec. 18, 2009, 17 pages.

Non-Final Office Action for U.S. Appl. No. 10/631,898, mailed on Feb. 18, 2010, 24 pages.

Non-Final Office Action for U.S. Appl. No. 10/654,417, mailed on Sep. 4, 2009, 20 pages.

Final Office Action for U.S. Appl. No. 10/654,417, mailed on Mar. 24, 2010, 28 pages.

Notice of Allowance for U.S. Appl. No. 10/654,417, mailed on Apr. 22, 2010, 14 pages.

Notice of Allowance for U.S. Appl. No. 10/668,455, mailed on Jun. 1, 2010, 8 pages.

Office Action for U.S. Appl. No. 10/925,155, mailed Mar. 20, 2008.

Office Action for U.S. Appl. No. 10/925,155, mailed on Oct. 27, 2008.

Office Action for U.S. Appl. No. 10/925,155, mailed on Apr. 14, 2009.

Office Action for U.S. Appl. No. 10/925,155, mailed on Jan. 11, 2010.

Non-Final Office Action for U.S. Appl. No. 10/458,628, Mailed Dec. 8, 2006, 14 pages.

Final Office Action for U.S. Appl. No. 10/458,628, Mailed Jun. 1, 2007, 19 pages.

Non-Final Office Action for U.S. Appl. No. 10/458,628, Mailed Nov. 30, 2007, 19 pages.

Non-Final Office Action for U.S. Appl. No. 10/458,628, Mailed Aug. 15, 2008, 20 pages.

Non-Final Office Action for U.S. Appl. No. 10/631,366. Mailed Feb. 2, 2007, 14 pages.

Non-Final Office Action for U.S. Appl. No. 10/631,898, Mailed Jul. 24, 2007, 11 pages.

Non-Final Office Action for U.S. Appl. No. 10/631,898, Mailed Feb. 20, 2008, 13 pages.

Non-Final Office Action for U.S. Appl. No. 10/631,898, Mailed Sep. 4, 2008, 14 pages.

Non-Final Office Action for U.S. Appl. No. 10/631,898, Mailed Apr. 28, 2009, 17 pages.

Non-Final Office Action for U.S. Appl. No. 10/654,417, Mailed Dec. 15, 2006, 11 pages.

Final Office Action for U.S. Appl. No. 10/654,417, Mailed Jun. 18, 2007, 15 pages.

Non-Final Office Action for U.S. Appl. No. 10/654,417, Mailed Dec. 31, 2007, 19 pages.

Non-Final Office Action for U.S. Appl. No. 10/654,417, Mailed Jul. 29, 2008, 19 pages.

Final Office Action for U.S. Appl. No. 10/654,417, Mailed Feb. 27, 2009, 17 pages.

Requirement for Restriction/Election for U.S. Appl. No. 12/392,422, mailed on Apr. 14, 2011, 5 pages.

Notice of Allowance for U.S. Appl. No. 12/478,216, mailed on May 5, 2011, 9 pages.

Non-Final Office Action for U.S. Appl. No. 10/458,628, mailed on Apr. 28, 2011, 23 pages.

* cited by examiner

SYSTEM AND METHOD FOR SOURCE IP ANTI-SPOOFING SECURITY

RELATED APPLICATIONS

The present application is a continuation of U.S. application Ser. No. 10/631,366, filed Jul. 31, 2003, now U.S. Pat. No. 7,523,485 (the '485 patent), issued on Apr. 21, 2009, which is incorporated herein by reference for all purposes. The '485 patent claims benefit from U.S. Provisional Patent Application Ser. No. 60/472,158, filed May 21, 2003, which is incorporated herein by reference for all purposes, and from U.S. Provisional Patent Application Ser. No. 60/472,170, filed May 21, 2003, which is incorporated herein by reference for all purposes.

FIELD OF THE INVENTION

The present invention relates to a method of providing for enhanced security on a computer network to reduce the risk created by the spoofing of IP addresses.

BACKGROUND

As is widely known source IP Address spoofing is a common technique used in denial of service attacks (DoS). Other types of source IP address spoofing attacks are widely known, and include attacks such as distributed denial of service attacks (DDoS), Worm attacks, and Man In the Middle attacks. Spoofed Source IP Address attacks can also include Smurf attacks, NameServer attacks, and ICMP, IGMP, and UDP protocol attacks. One goal in some spoofing attacks is to spread a software virus to as many random new victims as possible, and other attacks are designed to overwhelm a computer system, and other attacks are used to steal information.

Figure 1:
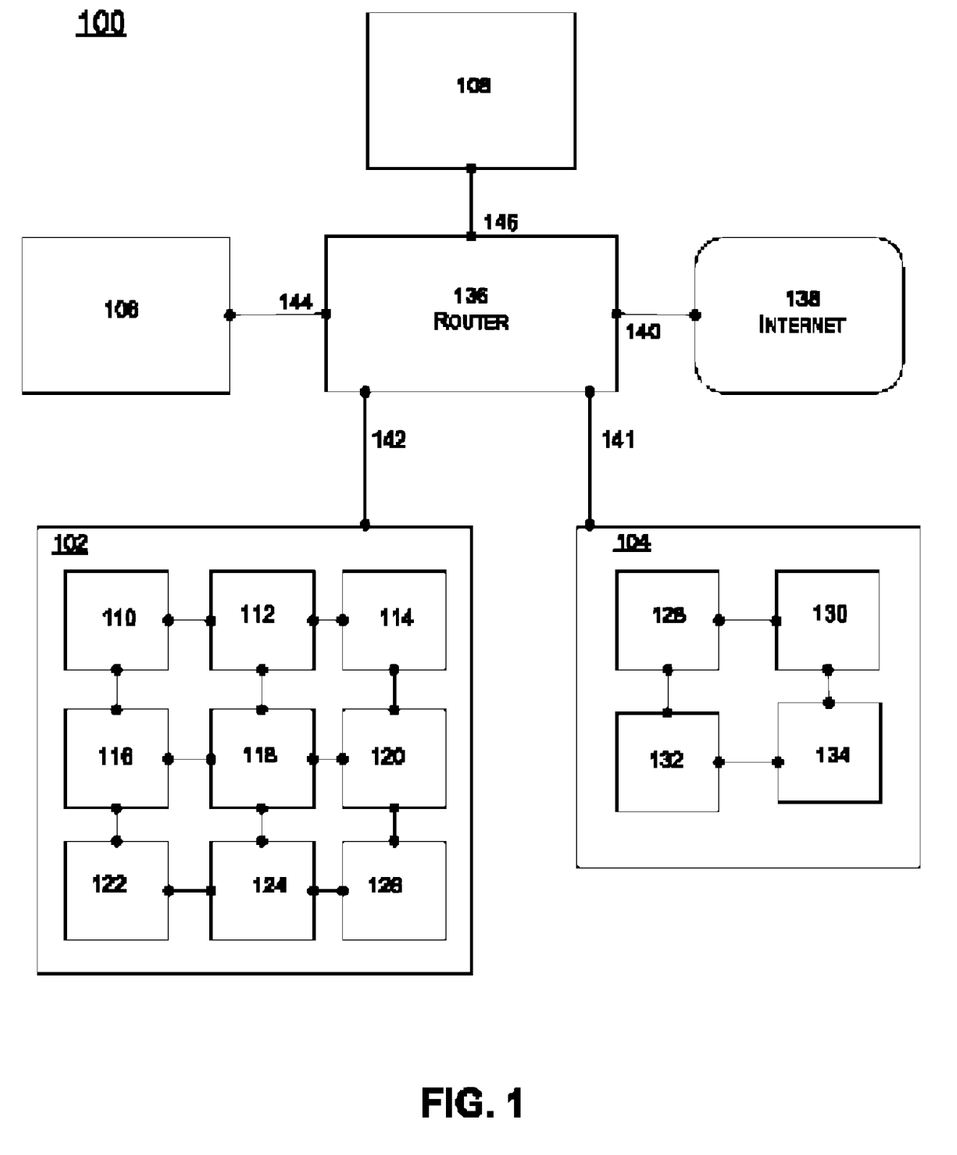
FIG. 1 shows an overview of a system of the prior art.

FIG. 1 shows a computer network 100 of the prior art. At the lowest layer (layer 1 of the OSI Networking protocols) is the physical layer which describes the actual physical elements such as cables and connectors which connect different devices of the computer network. The next layer of the system is the layer 2, the datalink layer. At this level, among other things, the MAC addresses are used to identify the devices which are interconnected on a subnet. As is widely known a MAC address is a unique address which corresponds to a device connected to a network. The MAC address is generally determined by the Ethernet board of a device which is connected to the network.

The computer network 100 can have a number of subnets. As shown in FIG. 1, the subnets are 102, 104, 106, and 108. Each subnet can contain a number of layer 2 devices such as switches. For example, subnet 102 is shown as having switches 110-126, and subnet 104 is shown as having switches 128-134. The layer 2 devices are not shown for subnets 106 and 108, but as one of skill in the art will appreciate, most subnets will include a number of layer 2 devices such as switches or hubs. Each switch can have a number of ports to which additional switches can be coupled, or to which host devices such as end user computers, or serves, or mainframes can be connected. At the subnet level different devices are connected to the subnet and can communicate with other devices on the subnet by transmitting data packets through the switches. These data packets include the MAC address for the device to which the data packet is to be sent (the destination MAC address) and the MAC address for the host which is sending the packet (the source MAC address). In addition each host device will be assigned an IP address. The IP address is utilized by a router 136 to determine routing for data packets which are being sent by a host on one subnet to a host on a different subnet, or to a different device which may require that the packet be transmitted via the Internet 138. The IP address is often assigned using the Dynamic Host Configuration Protocol (DHCP). Each host on a subnet will normally be assigned an IP address. As is widely known data packets generated by a host on the subnet can include information which is being sent from one host to another host, and further these data packets will include MAC addresses as described above, and a source IP address and a destination IP address.

Source IP spoofing occurs when an attacker host uses a source IP address, which does not correspond, or is not assigned, to its MAC address, in a transmitted data packet. For example, the attacker host may select a source IP address for a different host on a different subnet and transmit a data packet with this false, or spoofed, IP address. This data packet would then be received by the destination device, and the destination device would read the spoofed IP address and it would appear to the destination device that the data packet had come from the device which is actually assigned the source IP address which was used by the attacker host.

In terms of network security defenses, traditional blocks to this type for source IP spoofing were to create inbound filters on the router ports 140-146 that supported the subnets 102-108. The router filter operates such that it knows which IP addresses should be received from a specific subnet connected to the particular port. This allows ISP's and enterprises to block randomly spoofed source IP addresses, where the spoofed IP address received on a particular port of the router, is not consistent with source IP addresses for the subnet which is coupled to the particular port of the router. Hackers have recognized the limitations inherent in this type of source IP address anti-spoofing process, and developed spoofing software tools, some of which are referred to as "zombies, and "bots" which now spoof source IP addresses from within their own subnet and subnet mask settings. For customers with large class B subnets, the router level (layer 3) type of defense is not very effective as hundreds and potentially thousands of hosts on the subnet can still be affected.

An Automatic Spoof detector (referred to as "Spoofwatch") has been developed in an attempt to efficiently detect hosts performing source IP spoofing. Spoofwatch works on the premise that these hosts do not respond to ARP requests for their spoofed IP addresses. This solution has many potential shortcomings. For example, the router 136 can receive very large numbers of different source IP addresses in different data packets. Thus, a very large amount of router's processing power is consumed with generating the ARP requests and monitoring the responses.

A review of a number of different websites related to networking showed a number of different approaches related to preventing IP address spoofing, but each approach was very different than that discussed herein. Other techniques have been developed for providing defenses against source IP address spoofing. One of these other approaches relies on using encryption, and source IP filtering at the layer 3 level, which is after the data packets have been transmitted from the subnet to the router.

Additional information regarding different approaches to combating source IP spoofing can be found at http://www-.cisco.com/en/US/tech/tk86/tk803/technologies_tech_note09186a00800a7828.shtml. Additional websites provide discussion regarding the risks associated with source IP address spoofing and provide some discussion for ways to combat spoofing, see for example: http://www.sans.org/rr/threats/spoofed.php; http://www.cert.org/incident_notes/IN-2000-04.html; http://www.anml.i-u.edu/PDF/Automatic_Spoof_Detector.pdf; and http://www.linuxgazette.com/issue63/sharma.html.

In order to increase the efficiency and effectiveness of combating source IP spoofing it would be beneficial to provide source IP spoofing at lower level in the network hierarchy, in a manner which has not previously been provided.

DETAILED DESCRIPTION

One approach to improving defenses against Source IP Spoofing is to attack the problem at the subnet or Layer 2 level. Because ISP's and Universities have been hard hit with spoofing attacks, a feature that stops Source IP Spoofing at the Layer 2 subnet level provides a number of advantages. ISPs and Universities frequently have very large subnets, and as a result, utilizing defenses against spoofing at the router lever can consume an inordinate amount of the router's processing power. In the past networking devices, such as switches, at the subnet level did not analyze source IP addresses in data packets sent by hosts on the subnet, and in particular it is believed that networking devices at the layer 2 level did not analyze source IP address information in data packets to provide anti-spoofing security procedures based on an analysis of source IP address information in data packets transmitted by hosts on the subnet. Some layer 2 switching devices did provide for some security on ports of the switch, where the source host MAC address was used on an inbound filter on the port to which the host was connected. However, this MAC address type of port security did not provide effective protection against a host attacker that was spoofing source IP addresses.

Figure 2:
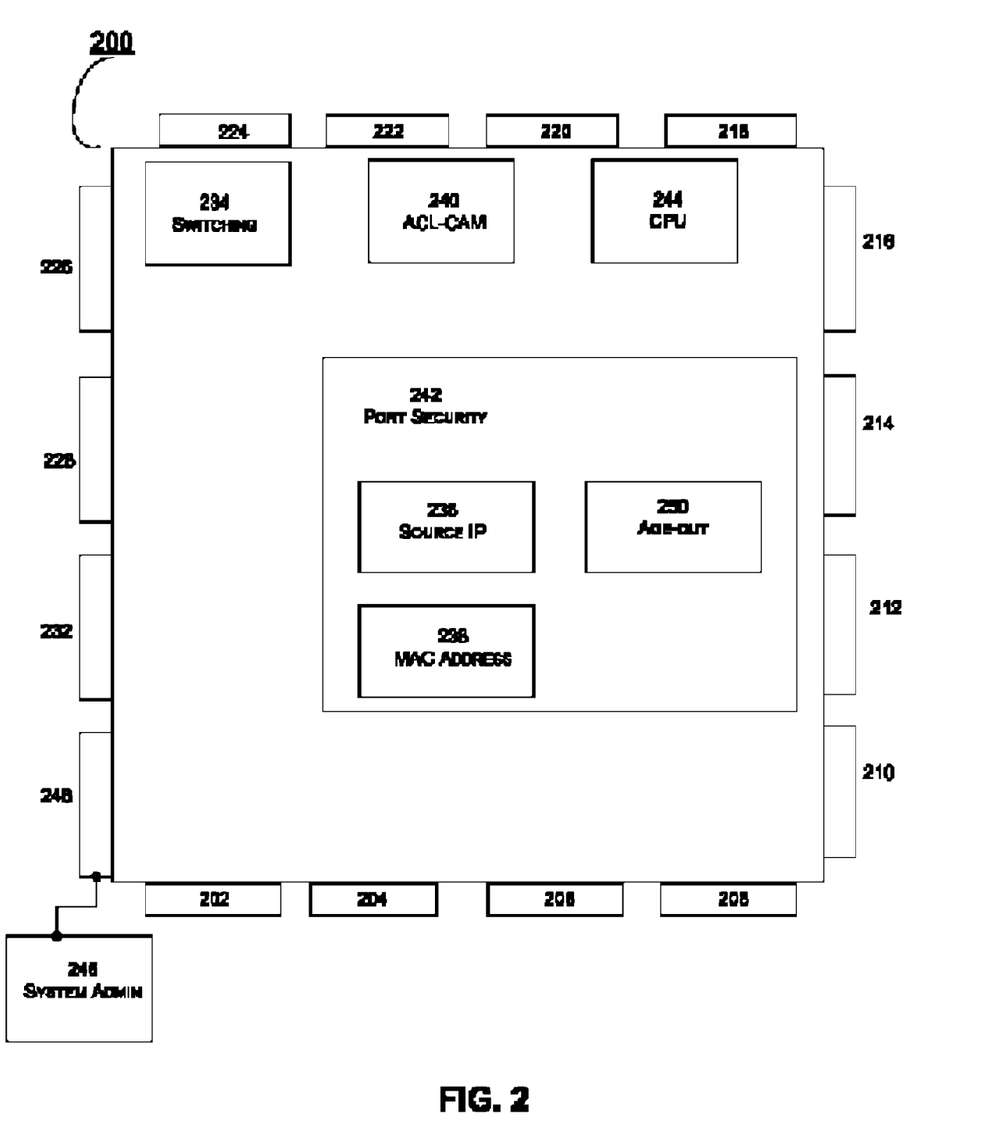
FIG. 2 shows an embodiment of a network device of the present invention.

FIG. 2 shows a view of an embodiment of a network device 200 of the present invention. This network device provides layer 2 switching functions. The network device includes a number ports 202-232. End user host devices (not shown) such as personal computers can be coupled to these ports 202-232, and it is possible for other network devices such as hubs or additional switches to be connected to a port of the network device 200. A subnet could include one of the network devices 200, or could include a large number of network devices 200 coupled together and connected with a large number of hosts to form a large subnet. The operation of the network device 200 allows for passing data packets received on a port through the network device switching 234 and then transmitting the received data packets through a different port, such that the data packet is transmitted to an intended destination device.

The basic switching operation of such a network device is well known. The network device 200 contains a processing device which operates to analyze data packets received on a port to identify the MAC address of the host sending the data packet. Each data packet can include at least the MAC address of the device sending the data packet (source MAC address) and the MAC address of the device to which the data packet is to be sent to (destination MAC address). As discussed above each host on the subnet can also have an IP address. In the past where one host device on a subnet is sending data packets to other host devices on the same subnet, a switching device would refer to a MAC address look up table to determine which port the destination host was on, and the data packet would be transmitted through the port which is connected with the destination host. A typical layer 2 switch would not analyze the source IP address in connection with this switching function, and would not use the source IP address to provide source IP anti-spoofing operations.

In the network device 200, however, additional functions are provided which allow for utilizing source IP address information. As described herein much of this additional functionality is described in connection with a port security processor 242. Functions of the port security processor can be implemented in a single processor, which is programmed to provide a number of different functions, or aspects of the functions of the port security could be implemented by different processors which work cooperatively to provide the functions herein. As shown in the embodiment of FIG. 2 the port security processor 242 includes a MAC address detector 238 which detects when a new host has been coupled to one of the ports 202-232 of the network device 200; the MAC address for the new host is stored in a table which correlates the MAC address for the new host with the port to which it is coupled. In one embodiment, this MAC address table would be stored in an ACL-CAM discussed in more detail below. In addition when a new MAC address is identified, a source IP address detector 236 operates to identify the source IP address which corresponds to the MAC address for the new host. This source IP address and the corresponding MAC address are then stored in the table such that each MAC address and source IP address is correlated with each other as a source IP address/MAC address pair.

The table which stores the IP address/MAC address pairs can be implement using a number of different devices. In the embodiment shown in FIG. 2 the table is embodied as an access control list, which are data fields, included in a content addressable memory 240, which is referred to as an ACL-CAM. By utilizing a content addressable memory where the functionality of the memory is determined by hard wiring (as opposed to a CPU which requires the loading of software), the switching of the of data packets is done at a very high speed, and once the MAC address has been determined and the source IP address has been learned, a CPU 244 of the network device 200 is able to operate to monitor and control other aspects of the of the operation of the network device, and the ACL-CAM will control access and switching through the ports.

Some prior switches allowed for initially learning source IP addresses for MAC addresses, however, these prior switches were not used for protecting against source IP address spoofing. One limitation of utilizing a prior switch was that these were not designed to allow for the fact that source IP addresses are generally not static, so the source IP address for a MAC address can change over time.

In the network device 200, the source IP address detector 236 automatically learns the source IP address for each MAC address entering a port of the network device 200. The port security processor 242 of the network device 200 also provides for dynamically adjusting inbound source IP address anti-spoofing blocking criteria for each port, and a system administrator can specify how many devices or IP addresses to permit per port of the network device 200. For example, the port security processor 242, can be programmed to receive input from a system administrator's computer 246, which can be coupled to the network device 200 by a secure port 248, and to provide information to the system administrator's computer 246. Using the ability to input commands to the network device 200 a system administrator can control aspects of the port security operation, as well as other aspects of the operation of the network device 200. For example, the system administrator could control the maximum number of source IP addresses which are learned from a port, and the network device 200 would reject any data packets with new source IP addresses that exceed the maximum number.

In one embodiment, the port security processor 242 will periodically poll ports for the learned IP addresses which are stored in the table to ensure that the host devices with the learned source IP addresses are still coupled to the port. If it is determined that a host device having the learned source IP address is no longer coupled to a port then source IP address for the host that is no longer present can be removed from the table so as to allow a new source IP address to have access on the port.

The network device 200 extends port security features beyond the MAC address filtering procedures that were used in prior layer 2 devices. The port security processor 242 allows source IP anti-spoofing protection to be activated selectively on a port-by-port basis. The port security processor 242 uses the source IP address detector 236 to automatically learn the source IP addresses for each host device attached to the port. To determine if the data packets received at a port contain a new source IP address that has not been learned, the ACL-CAM compares the source IP address and the MAC address in a received data packet, with the table of IP address/MAC address pairs.

When a new MAC Source Address is detected on a port by virtue of a received data packet identifying a new MAC source address, the source IP address detector 236 learns the association of source MAC address and the corresponding source IP address. Once the pair is learned, the ACL-CAM 240 is programmed with the information and switching of the network device proceeds to switch data packets normally.

The source IP address detector 236, can learn the source IP address for a host in a number of different ways. For example, the source IP address can be learned by using a reverse address resolution protocol (RARP) which provides for sending out the MAC address on the subnet, and in response the host having the MAC address responds with its IP address. The source IP address detector 236 could also learn the IP address for a host by listening to the DHCP response packet being returned to the host. This response contains the source IP Address for the host. When a DHCP packet is detected, the entry in the table for the MAC address receiving the DHCP packet with a source IP address is cleared and the source IP address provided in the DHCP packet is loaded into the table. This utilization of the DHCP response works well where the port is set to allow for one IP address. It should be noted that if a port is set to allow for more than one IP address for the port, then relying on the DHCP response alone may be insufficient, as the DHCP response may not allow for an unambiguous correlation of the source IP address to the correct MAC address. However, this ambiguity could be resolved if the DHCP request and the DHCP response were both tracked. Another technique provides for watching for the IP header information in a data packet when the host first transmits a data packet through a port. If a static IP address is used and the port is set to 1 IP Address, the user can unplug the cable (causing a link down) to reset the table, or a timer can be used to clear the table. Another technique provides for trapping (listening to) ARP requests and ARP reply messages to learn the source IP address and MAC address pairs, and storing the pairs in ACL-CAM for each port.

In addition to the above, it should be recognized that care must be taken to learn the correct source IP address. For example, in order to support delayed technologies, such as the widely known IEEE 802.1X standard which may postpone IP Address assignment until the port is authenticated, a tiered, or delayed, approach is required to successfully detect the source IP address. This approach could allow for first identifying the MAC address and then waiting for an appropriate amount of time to learn the correct IP address. It is important to avoid learning the IP addresses assigned by Microsoft or Apple operating systems which may be provided to a host when a DHCP server cannot initially be found. It can be advantageous to delay IP address learning process until a certain amount of traffic has passed through the port. Further the risk of possibly learning the wrong IP address can be reduced by allowing an system administrator to seed the IP learning process with the IP address properties that are consistent with the subnet to which the host is coupled. For example, if the IP Subnet is 10.32.1.0/24, then this information can be used to seed the IP learning process and only match a MAC address with an IP addresses consistent with the subnet 10.32.1.0/24 addresses. This will eliminate false learning of a default 169.0.0.0 addresses assigned by Microsoft or Apple operating systems when a DHCP server is not initially located. It is also advantageous to confirm that the learned IP address is correct by performing a reverse IP check.

Once the learned IP address has been confirmed, and the IP address/MAC address pair has been stored in the ACL-CAM, blocking procedures are applied to the port. If there is more than one host device allowed per port, this process of determining MAC address and source IP address pairs will be repeated for each learned IP address on the port. Once a new source IP Address is confirmed, the inbound blocking procedures are applied to the port and includes the new source IP Address. Additional MAC address and IP address pairs will continue to be learned until the maximum number of MAC and IP Addresses is reached. The source IP anti-spoofing procedures should be compatible with existing MAC address port security and 802.1X Port Authentication features. In order to provide for compatibility the following order of execution can be used. First, MAC address port security is utilized, which confirms that a MAC address present on a port is a valid MAC address, and if it is not MAC port security procedures block data packets from the invalid MAC address. If 802.1X Port Authentication is enabled, the user will be prompted for the 802.1X user credentials to authenticate the port and either permit or deny data packet traffic based on the success or failure of the IEEE 802.1x authentication process. Source IP Security is then used, if enabled, to check if the maximum number of source IP addresses has been learned for a port. If the maximum number of source IP address has not been learned for the port, then the source IP address will be learned and confirmed, and the pairing of the source IP address with MAC address will be set in a table.

In order for the blocking to be efficient and fast, it should be implemented in hardware, such as a CAM having an ACL, as opposed to using a CPU where the operation would be slower. The source IP anti-spoofing methods can provide for different types of security. For example, one aspect of the operation described herein provides for allowing an system administrator to set a maximum number of source IP addresses for a port. By limiting the number of the source IP addresses which can transmit data packets through a port of the network device 200, the risk of certain types of spoofing attacks (such as DoS attacks) can be prevented. This aspect of the operation provides for blocking of data packets at the port of the network device based on the source IP address contained in the data packet. For example, by limiting the number of source IP addresses on a port, an attacking host could only use a limited number of spoofed IP addresses before the maximum number of source IP addresses for the port would be exceeded.

A second operation of the network device 200 blocks data packets at the port, where the data packet contains a source MAC address and source IP address pair which does not match one of the previously identified MAC address/IP address pairs stored in the table. In this operation, a host device which is attempting to use a source IP address which does not match the correct source IP address for the MAC address will be blocked at the port. This second part of the operation provides for a high level of security against source IP spoofing attacks.

It should be noted that embodiments of the methods and systems herein can be provide for a significant amount of flexibility, which can provide a system administrators and ISPs with a powerful tool to combat source IP spoofing. For example, as discussed above, in one embodiment the number of source IP Addresses which can be associated with each switch port can be selected by an administrator. If more than one source IP address is permitted per port, then source IP spoofing is possible if the attacking host is using a validated MAC address, unless the source IP Security process as been activated to provide for port access based on correlating the learned source IP Address to its MAC address, such that access on a port is blocked, or permitted, based on the matching of the MAC/IP address pair in a received data packet with a MAC/IP address pair stored in a table. It should be recognized, however, that even without providing security based on the MAC/IP address pairs, some degree of protection against Source IP spoofing is provided by allowing the number of source IP addresses on the port to be controlled.

The port security processor 242 can also include a source IP age out timer 250. The port security processor 242 can allow an administrator to specify a time period for a source IP age-out timer. This timer can clear the ACL-CAM, or other possible table, of source IP addresses, every n seconds to allow the network device 200 to support downstream hubs and switches for multi-host configurations. If a timer were not provided then source IP addresses which were previously on the port might prevent new source IP addresses from gaining access to the port, where the maximum number of source IP addresses would be exceeded. In short, it would not be practical to maintain a link for a source IP address indefinitely. Where an administrator did not want to have a time out entry they could specify a zero "0" for the timer, and a default of 60 or 120 seconds or other appropriate time could be provided. Additionally, or alternatively, the source IP age out timer could also be flow based, which would provide that if the flow stops for a source IP address, for a period of n seconds, then the source IP address can be removed (aged out) from the table.

An embodiment of the system and method can also provide for capturing the information when a possible IP spoofing attempt has occurred. This information could then be used to generate syslog messages which could be transmitted and recorded in a log to record information regarding the operation of the system, including possible IP spoofing attempts.

As shown by the discussion above, it is important in many applications of the source IP security operations herein, that the table containing the learned source IP addresses be dynamic, such that the table can be updated so that timed out source IP addresses can be removed and new learned source IP addresses can be added to the table. Further, being able to change entries in the table allows for the fact that the source IP addresses assigned for a given host can change over time. This means that when the learned source IP addresses are stored in an ACL-CAM, these addresses should not be saved when a write only memory operation is performed.

The port security processor 242 should be programmed such that an administrator can view the source IP addresses learned and/or assigned to the port. Further, the IP security device should allow and administrator to view the setup and configuration of the timers and source IP address ACL's. The port security processor 242 should provide commands which allow an administrator to clear a singe entry from the table, and to allow the administrator to clear all entries from the table. Further, debugging tools may also be provided to allow administrators to troubleshoot the security procedures for their particular environments.

Figure 3:
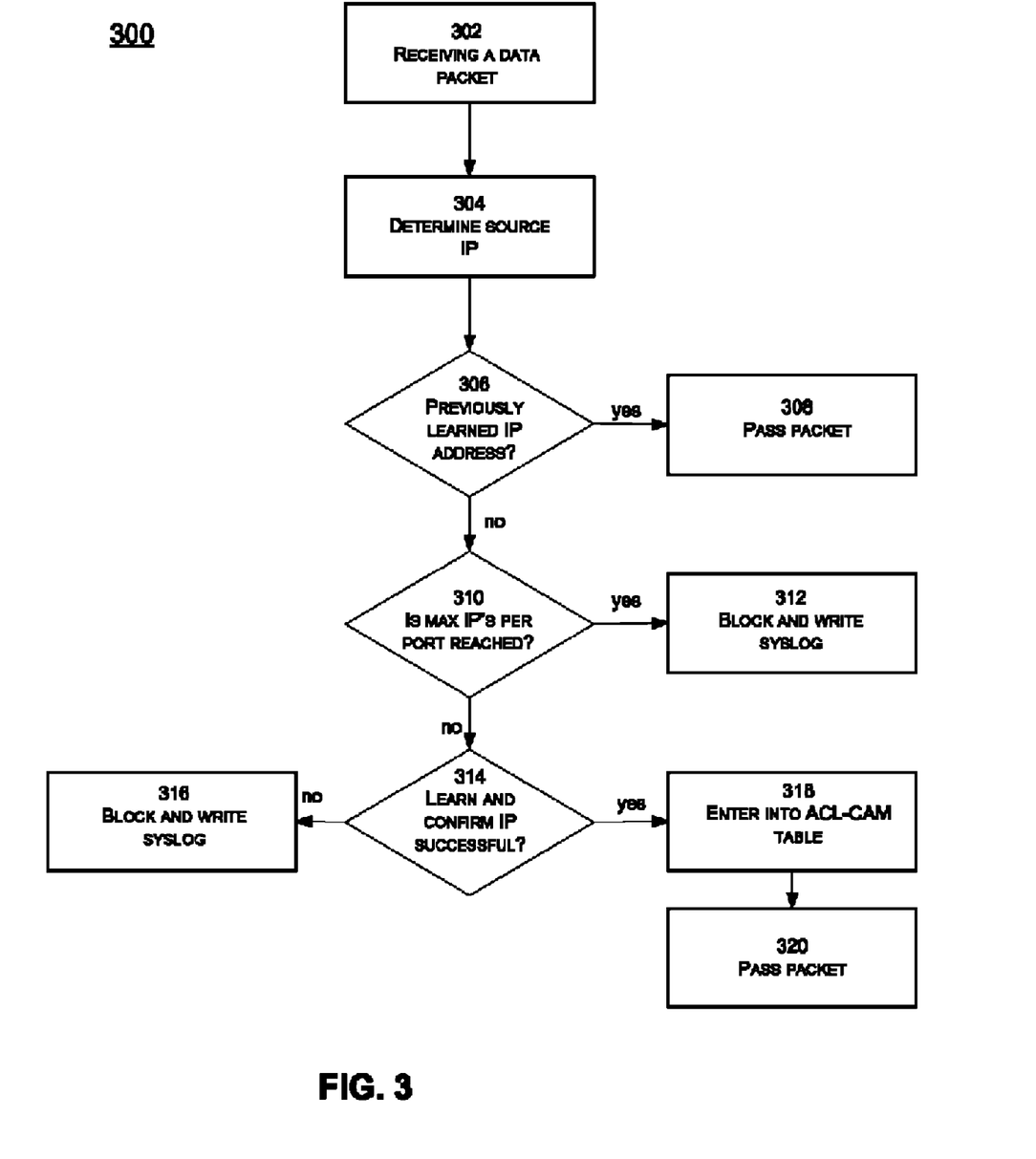
FIG. 3 shows a method of an embodiment of the present invention.

FIG. 3 is a flowchart showing a method 300 of an embodiment of the method herein. The method provides for receiving 302 a data packet from a host on a port of the network device. The data packet is analyzed 304 to determine its source IP address. The determined source IP address is then compared 306 with the source IP address, or addresses, which have previously been learned and stored in a table as source IP address which is permitted access to the network through the port. If it is a previously learned IP address then the data packet is passed 308 through the port. If it is not a previously learned source IP address, then it is treated as a new source IP address. Once it is determined a new IP address is on the port, then it must be determined 310 if the maximum number of source IP addresses are present on the port. If the maximum number of source IP addresses are present on the port, then the data packet with the new source IP address is blocked 312 and the information relating to the blocking of the port is transmitted in a trap and syslog message. If the maximum number of the source IP addresses are not present on the port, then a learn source IP routine is performed 314 (various methods related to this are described above). Typically the learn source IP routine will include doing a reverse IP check to confirm the source IP address. If the confirmation or learning of the source IP address fails then the data packet containing the new source IP address is blocked 316 and syslog message can be generated. If the learning and confirmation of the new source IP address is successful, then the new source IP address is stored 318 in a table indicating that the new source IP address is permitted access through the port. As discussed above this storing of the new source IP address in a table, can include storing the information in an ACL-CAM. Further a syslog message could also be transmitted in connection this operation. At this point the data packet with new source IP packet can be passed 320 through the port. Further, an additional operation not shown in the flow chart includes the operation of the age-out timer which would provide for removing previously learned source IP addresses which are stored in the table and determined to no longer be present on the port.

Figure 4:
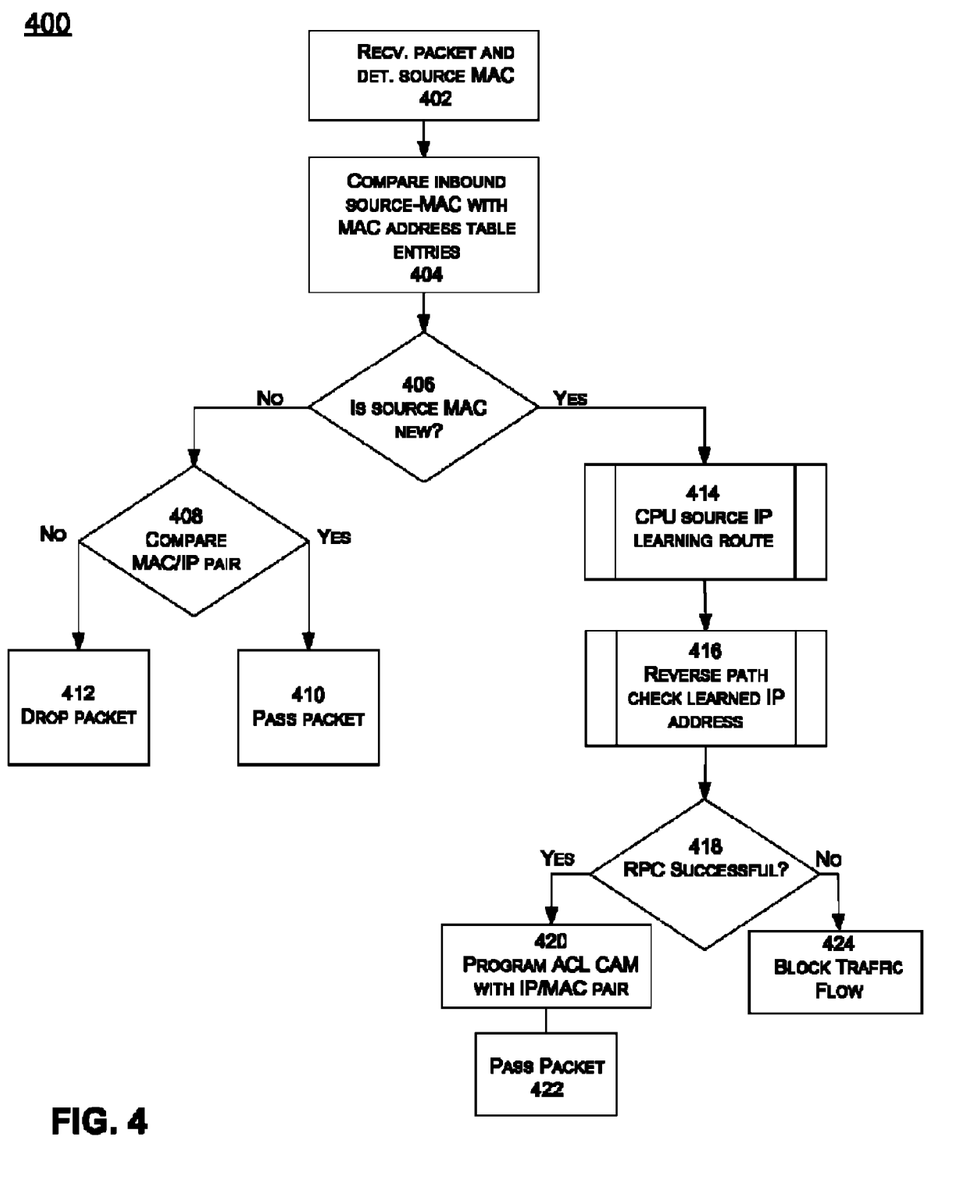
FIG. 4 shows a method of an embodiment of the present invention.

FIG. 4 shows a method 400 of another embodiment of the invention. The method 400 provides for receiving a data packet on a port and determining its source MAC address 402. The determined source MAC address is compared 404 with MAC addresses shown in a table 404. A determination 406 is made as to whether the source MAC address is new, which would mean that it is not in the table. If the source MAC address was previously stored in the table, then the source IP address and MAC address pair for the received data packet is compared 408 with the source IP address/MAC address pairs in the table. If the pair for the received data packet is found in the table then the received data packet is passed 410 through the port. If the pair for the received data packet is not found in the table, then the received data packet is blocked, or dropped 412 at the port.

If the received data packet at the port has a MAC address which is new, then the source IP address for the received data packet is learned 414 using one of the processes described above. After the source IP address has been learned, a reverse IP check 416 is done to confirm the source IP address. If the reverse IP check is successful 418, then the table is programmed 420 with the IP address/MAC address pair, and the packet is passed 422. If the reverse IP check is not successful then the received data packet is blocked 424, or dropped at the port.

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A method comprising:
   determining, by a network device, whether a source IP address included in a data packet received on a port of the network device is stored in a table of the network device; and
   if the source IP address is not stored in the table:
      determining, by the network device, whether a number of source IP addresses stored in the table for the port equals or exceeds a maximum number of source IP addresses predetermined for the port; and
      if the number of source IP addresses stored in the table for the port does not equal or exceed the maximum number:
         determining, by the network device, whether a MAC address included in the data packet is stored in the table; and
         if the MAC address is not stored in the table:
            learning, by the network device, the source IP address; and
            storing, by the network device, the MAC address and the source IP address in the table.

2. The method of claim 1 further comprising, if the MAC address and source IP address are stored in the table, allowing the data packet to pass through the port.

3. The method of claim 1 further comprising, if the MAC address is not stored in the table or if the source IP address is not stored in the table, preventing the data packet from passing through the port.

4. The method of claim 1 further comprising using the table to control transmission of data packets through one or more ports of the network device.

5. The method of claim 1 further comprising, if the source IP address is stored in the table, allowing the data packet to pass through the port.

6. The method of claim 1 further comprising, if the number of source IP addresses stored in the table for the port equals or exceeds the maximum number, preventing the data packet from passing through the port.

7. The method of claim 1 wherein learning the source IP address comprises:
   generating a reverse Address Resolution Protocol (ARP) message based on the MAC address included in the data packet; and
   determining whether a source IP address included in a response to the reverse ARP message matches the source IP address included in the data packet.

8. The method of claim 7 further comprising confirming that the learned source IP address is correct by performing a reverse IP check.

9. The method of claim 1 further comprising, subsequently to storing the source IP address in the table, removing the source IP address from the table after a predetermined time interval.

10. The method of claim 1 wherein the table is configured to store a plurality of MAC address and source IP address pairs.

11. The method of claim 1 wherein the table is stored in a Content Addressable Memory (CAM) device of the network device.

12. A network device comprising:
   a plurality of ports;
   a memory configured to store a table of MAC address and source IP address pairs; and
   a processor configured to:
      determine whether a source IP address included in a data packet received on a port in the plurality of ports is stored in the table; and
      if the source IP address is not stored in the table:
         determine whether a number of source IP addresses stored in the table for the port equals or exceeds a maximum number of source IP addresses predetermined for the port; and
         if the number of source IP addresses stored in the table for the port does not equal or exceed the maximum number:
            determine whether a MAC address included in the data packet is stored in the table; and
            if the MAC address is not stored in the table:
               learn the source IP address; and
               store the MAC address and the source IP address in the table.

13. The network device of claim 12 wherein the processor is further configured to use the table to control transmission of data packets through the port.

14. The network device of claim 12 wherein the processor is further configured to prevent the data packet from passing through the port if the number of source IP addresses stored in the table for the port equals or exceeds the maximum number.

15. The network device of claim 12 wherein learning the source IP address comprises:
   generating a reverse Address Resolution Protocol (ARP) message based on the MAC address included in the data packet; and
   determining whether a source IP address included in a response to the reverse ARP message matches the source IP address included in the data packet.

16. The network device of claim 15 wherein the processor is further configured to confirm that the learned source IP address is correct by performing a reverse IP check.

17. The network device of claim 12 wherein the processor is further configured to, subsequently to storing the source IP address in the table, remove the source IP address from the table after a predetermined time interval.

18. The network device of claim 12 wherein the memory is a Content Addressable Memory (CAM) device.

19. A method comprising:
   determining, by a network device, whether a number of source IP addresses stored in a table of the network device for a port on which a data packet is received equals or exceeds a maximum number of source IP addresses predetermined for the port; and
   if the number of source IP addresses stored in the table for the port does not equal or exceed the maximum number:
      determining, by the network device, whether a MAC address included in the data packet is stored in the table; and
      if the MAC address is not stored in the table:
         storing, by the network device, the MAC address and a source IP address included in the data packet in the table.

20. A network device comprising:
   a plurality of ports;
   a memory configured to store a table of MAC address and source IP address pairs; and
   a processor configured to:
      determine whether a number of source IP addresses stored in the table for a port in the plurality of ports on which a data packet is received equals or exceeds a maximum number of source IP addresses predetermined for the port; and
      if the number of source IP addresses stored in the table for the port does not equal or exceed the maximum number:
         determine whether a MAC address included in the data packet is stored in the table; and
         if the MAC address is not stored in the table:
            store the MAC address and a source IP address included in the data packet in the table.

* * * * *